US007613817B2

(12) United States Patent
Eibach et al.

(10) Patent No.: US 7,613,817 B2
(45) Date of Patent: Nov. 3, 2009

(54) COUNTING AND BILLING MECHANISM FOR WEB-SERVICES BASED ON A SOAP-COMMUNICATION PROTOCOL

(75) Inventors: Wolfgang Eibach, Holzgerlingen (DE);
Matthias Gruetzner, Schonaich (DE);
Dietmar Kuebler, Altdorf (DE)

(73) Assignee: International Business Machines Corporation, Armonk, NY (US)

( * ) Notice: Subject to any disclaimer, the term of this patent is extended or adjusted under 35 U.S.C. 154(b) by 1495 days.

(21) Appl. No.: 10/466,937

(22) PCT Filed: Mar. 14, 2002

(86) PCT No.: PCT/EP02/02815

§ 371 (c)(1),
(2), (4) Date: Nov. 6, 2003

(87) PCT Pub. No.: WO02/082305

PCT Pub. Date: Oct. 17, 2002

(65) Prior Publication Data

US 2004/0073661 A1    Apr. 15, 2004

(30) Foreign Application Priority Data

Apr. 4, 2001    (EP)    .................................. 01108466

(51) Int. Cl.
*G06F 15/16*    (2006.01)
(52) U.S. Cl. ........................ 709/231; 709/232; 709/233
(58) Field of Classification Search ................. 709/231, 709/232, 233

See application file for complete search history.

(56) References Cited

U.S. PATENT DOCUMENTS 5,794,221 A * 8/1998 Egendorf ...................... 705/40

(Continued)

FOREIGN PATENT DOCUMENTS

JP              9146129           6/1997

(Continued)

OTHER PUBLICATIONS

K. Kumagai, Visual Basic Magazine vol. 6, 13, pp. 37-43 Nov. 1, 2000.

*Primary Examiner*—John Follansbee
*Assistant Examiner*—Nghi Tran
(74) *Attorney, Agent, or Firm*—McGinn IP Law Group, PLLC

(57) ABSTRACT

The present invention discloses a system and method for counting Web-Services by means of a Resource-Counter Service offered as an own, independent Web-Service based on a SOAP communication protocol as well as a system and method for billing Web-Services using the result of the Resource-Counter Service for calculation of a charge. The Resource-Counter Service may be accessed by all Service-Provider having service description of the Resource-Counter Service. The service description for the Resource-Counter Service may be preferably created and published by the Service-Provider, categorized by the Service-Broker, and can be found and used to invoke the Resource-Counter Service by all Service-Provider using a charging model for their Web-Services. The Resource-Counter Service mainly provides the functionality to create all necessary data allowing calculation of the charge for the use of a Web-Service. The final calculation of the charge itself may be done by a separate specific accounting and bill presentment component.

1 Claim, 4 Drawing Sheets

U.S. PATENT DOCUMENTS

| | | | |
|---|---|---|---|
| 5,960,409 A | | 9/1999 | Wexler |
| 6,047,051 A | * | 4/2000 | Ginzboorg et al. .......... 379/130 |
| 2003/0053459 A1 | * | 3/2003 | Brouk et al. ................ 370/392 |

FOREIGN PATENT DOCUMENTS

| | | |
|---|---|---|
| JP | 2000031230 | 2/2000 |
| WO | WO97/03410 | 1/1997 |

* cited by examiner

COUNTING AND BILLING MECHANISM FOR WEB-SERVICES BASED ON A SOAP-COMMUNICATION PROTOCOL

The present invention relates generally to computer systems and more particular to the access counting, and billing mechanism for Web-Services based on a SOAP-communication protocol.

A new technology currently evolves in the Internet, the so called Web-Services. Web-Services may be defined as providing existing or new e-business services into a service-oriented architecture (SOA). These Web-Services are normally offered by independent Service-Providers to support other Internet user in managing their Internet activities. Examples of such services may be tax calculation for an online shop, payment handling for internet shops, or document translation into various languages. To support these Web-Services in the Internet, a new architecture was defined, SOA, the Service Oriented Architecture. This new architecture describes how a Web-Service may be found by user, how a potential user can access such Web-Services, and a language describing The communication protocol for these Web-Services is also a new defined protocol, called SOAP which stands for Simple Object Access Protocol.

SOAP is a way for a program running in one kind of operating system to communicate with a program in the same or another kind of an operating system by using preferably the World Wide Web's Hypertext Transfer Protocol (HTTP) and its Extensible Markup Language (XML) as the mechanisms for information exchange. Since Web protocols are installed and available for use by all major operating system platforms, HTTP and XML provide an already at-hand solution to the problem of how programs running under different operating systems in a network can communicate with each other. SOAP specifies exactly how to encode an HTTP header and an XML file so that a program in one computer can call a program in another computer and pass it information. It also specifies how the called program can return a response.

Figure 1:
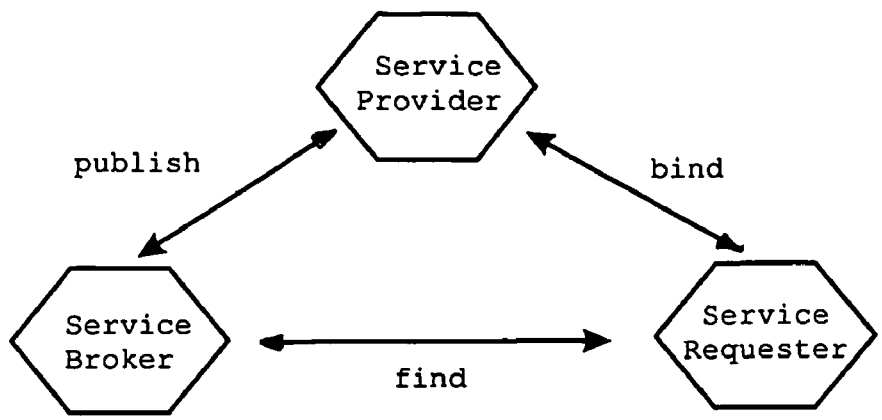

The basic architecture of SOAP is shown in FIG. 1. The basic architecture comprises three components, the Service-Providers, the Service-Brokers, and the Service requesters.

The Service-Providers publish the availability of their Web-Services, the Service-Brokers register and categorize the published Web-Services and provide search services, and the Service Requesters using Service-Broker to find a needed Web-Service and then employing that Web-Service.

Figure 2:
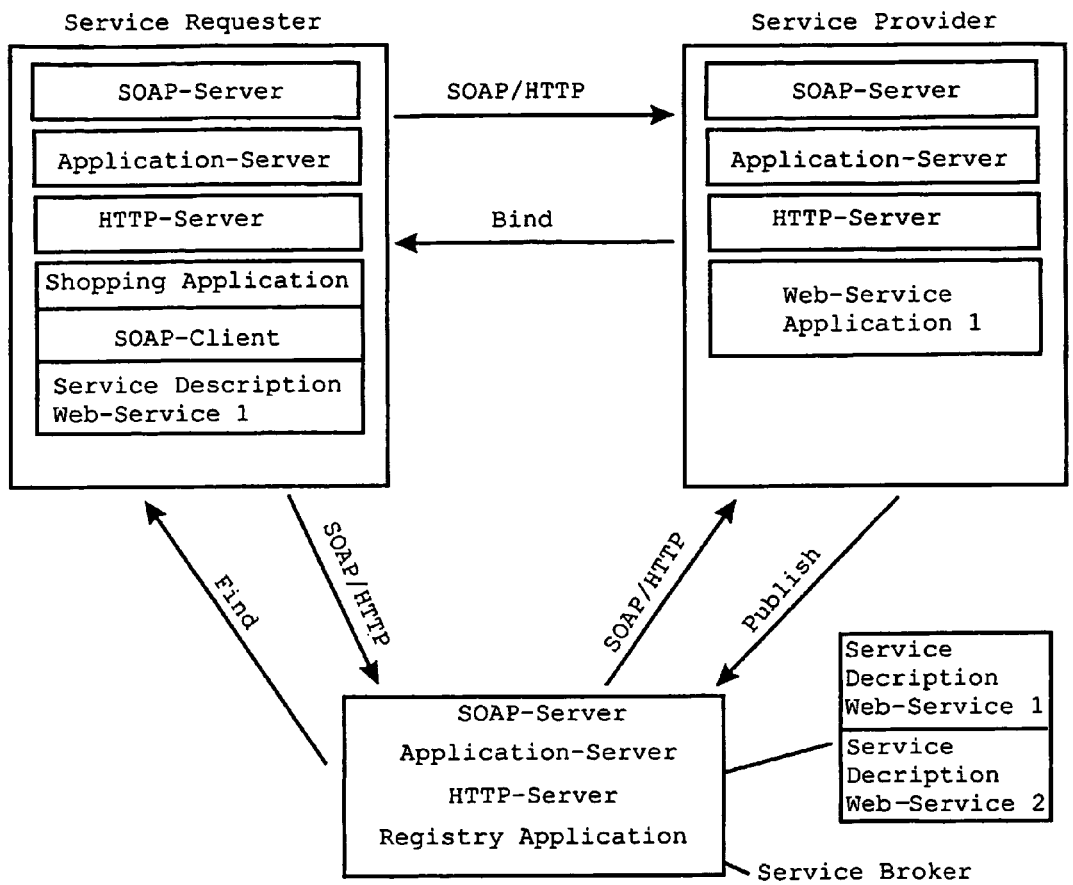

A typical SOAP-communication architecture as used by the prior art is shown in FIG. 2.

Service-Provider offers a Web-Service e.g. a tax-calculation service. Service-Providers publish their Web-Service to Service-Broker. The Service-Provider knows the semantics of the Web-Service and publishes it in the right category in the Service-Broker's taxonomy. What is published by the Service-Provider to the Service-Broker is called service description. Service descriptions are XML documents that describes the semantics and the message API (Application Programming Interface) of a certain Web-Service. For example, the service description for a tax calculation program may include price of the service, availability, functionality, URL, IDL and so on. IDL, or Interface-Definition-Language, defines the input and output data required by that Web-Service. Service requesters, knowing the Web-Service they need, ask the Service-Broker for a list of services in that category. A Service-Requester receives by SOAP-Find response a service description for the requested Web-Service. The Service Requester uses the IDL for converting the input data format generated by the shopping application into a data format required by Web-Service and sends a SOAP-request containing the converted input data to the Web-Service. The Web-Service returns a SOAP response containing the result (output data), e.g. tax result, to the Service Requester.

The SOAP-architecture as discussed above does not address at all the aspect of charging of the new Web-Services. As far as new Web-Services are offered by the Internet today they are either free or financed by commercials.

At present there is no generalized charging model for the SOAP-Web-Service architecture allowing Service-Provider to charge their Web-Services.

It is therefore object of the present invention to provide a generalized charging model for Web-Services which may integrated very easily in the present SOAP architecture.

This object is solved by the features of the independent claims. Further preferred embodiments of the present invention are laid down in dependent claims.

BRIEF SUMMARY OF THE INVENTION

The present invention discloses a system and method for counting Web-Services by means of a Resource-Counter Service offered as an own, independent Web-Service based on a SOAP communication architecture as well as a system and method for using the result of the Resource-Counter Service for calculation of a charge based on the SOAP-communication protocol. The Resource-Counter Service may be accessed by all Service-Provider having access to the service description of the Resource-Counter Service. The service description for the Resource-Counter Service may be preferably created and published by the Service-Provider, categorized by the Service-Broker, and can be found and used to invoke the Resource-Counter Service by all Web-Service-Provider using a charging model. The Resource-Counter Service mainly provides the functionality to create all necessary data allowing calculation of the charge for the use of a Web-Service, e.g. begin time for service, end time for service. The final calculation of the charge itself may be done by a separate specific accounting and bill presentment component which may be also implemented as an extension to the Resource-Counter Service. In addition to bill presentment and calculating charges, the data of the Resource-Counter Service can be used to trigger any kind of electronic payment process. The data of the Resource-Counter can be mapped to different rating models. It therefore supports multiple Service providers with their different business models. Finally, the Resource-Counter Service may provide further functionalities in connection with charging a Web-Service, e.g. create Service Requester accounts and contracts, provide a set of accounting model templates.

Figure 3:
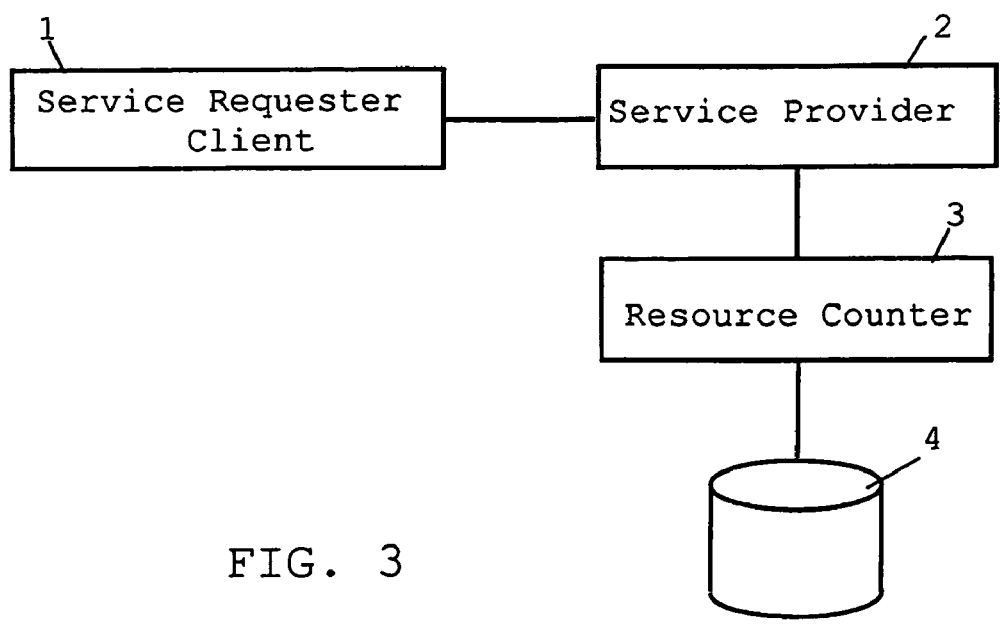
Figure 4:
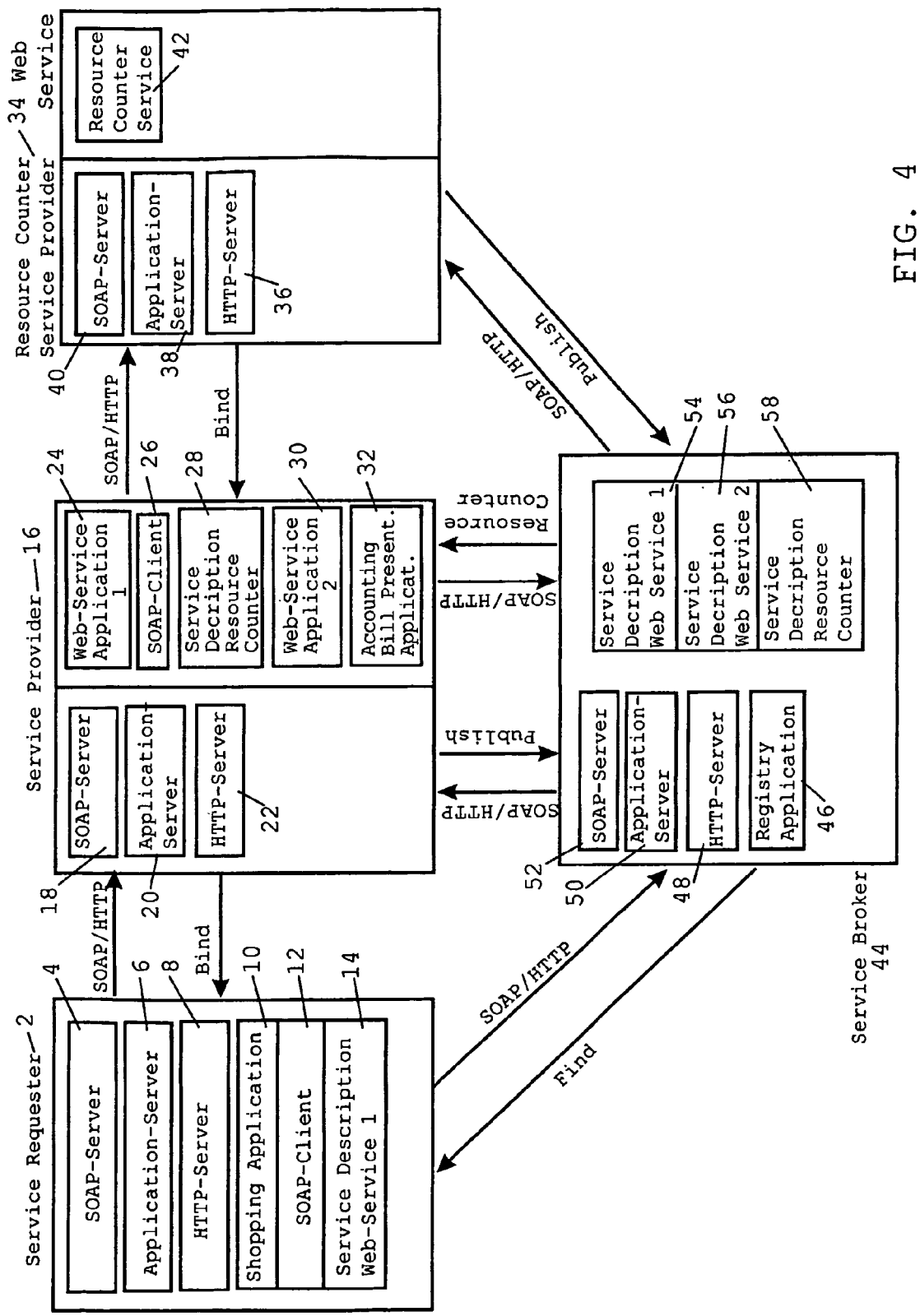
Figure 5:
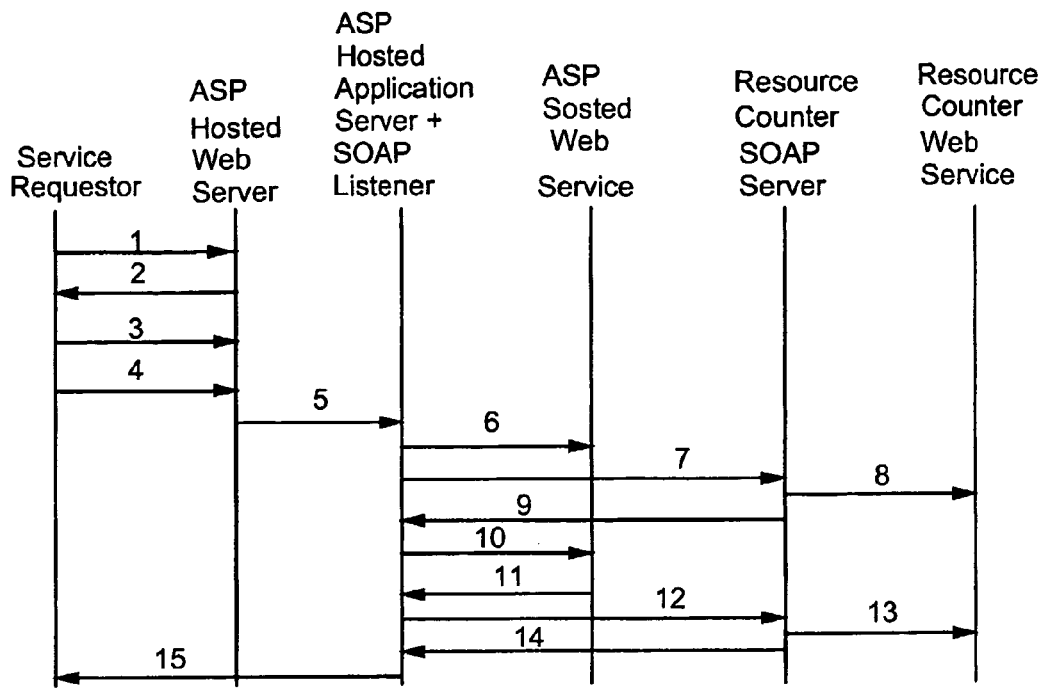
Figure 6:
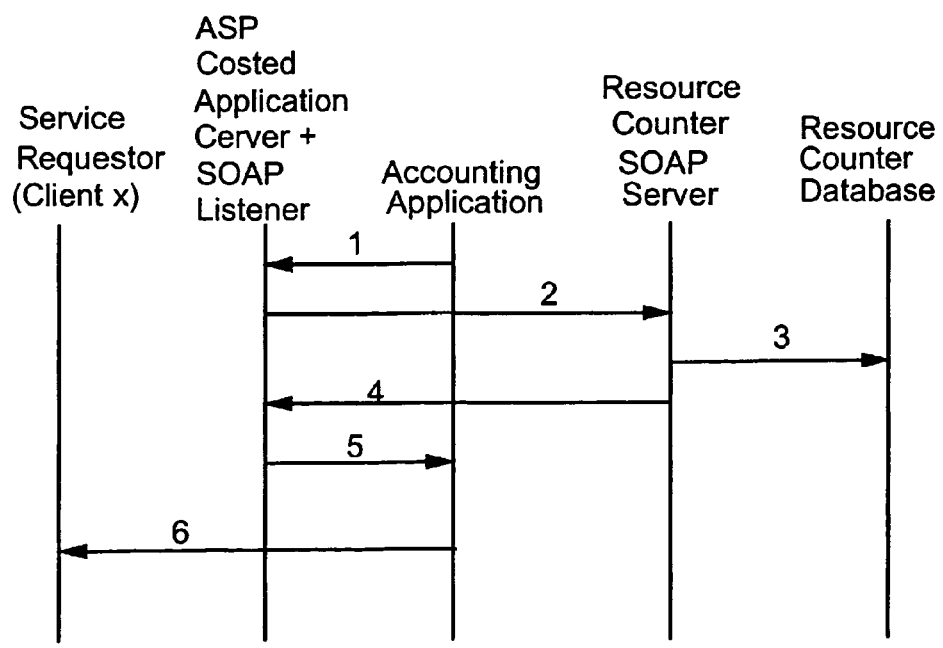

FIG. 1 shows the basic structure of a SOAP-Web-Service architecture on which the present invention is based FIG. 2 shows an example for a typical SOAP-Web-Service-communication architecture as used by the prior art FIG. 3 shows the inventive Resource-Counter implemented in a SOAP-Web-Service architecture FIG. 4 shows an existing SOAP-communication architecture as shown in FIG. 2 extended by the inventive Resource-Counter Service FIG. 5 shows an interaction diagram for using the inventive Resource-Counter Service FIG. 6 shows an interaction diagram for creation of a bill based on information received from the inventive Resource-Counter-Service In FIG. 3 the basic idea of the present invention is shown. The existing SOAP-architecture will be extended by an Resource-Counter Service being accessible as own Web-Service. The Resource-Counter Service may be invoked via SOAP messages as follows: The Service Requester (client x) 1 uses a Web-Service from the Service-Provider 2. If this Web-Service is not free of charge, Service-Provider 2 contacts Resource-Counter Service 3 for providing accounting service. It is assumed that the Service-Provider 2 has a contract with the Service-Provider for the accounting service 3. Resource-Counter Service may be also an internal service of the Service-Provider itself. Service-Provider 2 will send a SOAP message request to the Resource-Counter Service 3 asking for accounting for its Service Requester 1 by providing at least begin time for service and end time of service.(FIG. 4 shows a detailed communication protocol for that case). After a certain period (e.g. one week, one month), Service-Provider 2 will request from the Resource-Counter Service-Provider 3 all records for the accounting period. These records are stored on a data base 4, and will be sent as a SOAP response on request. These records may be used for calculating the charge generated by Service Requester. The Resource-Counter Service mainly provides the functionality to create all necessary data allowing calculation of the charge for the execution of a Web-Service, e.g. begin time for service, end time for service. The final calculation of the charge itself may be done by a separate specific accounting and bill presentment component which may be also implemented as an extension to the Resource-Counter Service.

FIG. 4 shows a typical SOAP-communication architecture extended by the inventive Resource Counter-Service. Service-Provider 16, 18, 20, 22 offers Web-Services 1 and 2, e.g. a tax-calculation service. Another Service-Provider 34 offers a Resource-Counter-Service 42. Both Service-Provider 16, 34 publish service descriptions 14, 28 for their Web-Services in the right category in the Service-Broker's taxonomy 44; 46, 48, 50, 52 using a SOAP message response (Publish). Service Requester 2; 4, 6, 8 as well as Service-Provider 16 receive the service description 14, 28 of the requested Web-Services by a SOAP message response (Find). The Service Requester 2, especially its SOAP client 12, creates a SOAP message request by using service description 14 of the requested Web-Service for converting the shopping application data 10, e.g. an order list created by the user, into a data representation required by requested Web-Service 24, 30 and sends a SOAP message request containing the converted shopping application data 10 as well as authentication data to the Service-Provider 16. If the authentication succeeds, the SOAP message request is then executed by the Application Server 20 using the SOAP Server 18 for calling up the requested Web-Service 24, 30, e.g. tax calculation application. When the Web-Service is completed, Service-Provider 16 sends a stop counting request to the Resource-Counter Service-Provider 34. The Resource-Counter Service 42 stores an account record to the data base. After a certain period of time, the Service-Provider 16 receives the account records for calculating the charges for his Service Requester 2 using an accounting and bill presentment component 32. In an another embodiment of the present invention, the Resource-Counter Service 42 has the additional functionality to create a bill for each Service Requester 2 based on a billing profile provided by the Service-Provider 16. The bill may be sent to the Service Requester 2 either by the Service-Provider 16 providing Web-Service or directly from the Resource-Counter Service 42 to the Service Requester.

FIG. 5 shows an interaction diagram for using the inventive Resource-Counter Service.

The interaction diagram shows a method for execution of a Web-Service at an Application Service Provider machine (ASP) using a HTTP/SOAP based communication protocol. The requested Web-Service is not free of charge, and therefore the Resource-Counter Service is invoked for counting.

The Service Requester sends a HTTP-logon request to the ASP 1. The ASP returns an authentication request 2. For example ASP sends an authentication request containing a random number to the Service Requester. The Service Requester uses its secret key and cryptographic algorithm to encrypt the random number. The Service Requester sends a response to the ASP containing the encrypted random number along with identifying information. The ASP uses the identifying information to retrieve the secret for the Service Requester from its database.

It uses this key to encrypt the same random number sent to the Service-Provider using the same algorithm as the Service Requester. ASP compares the encrypted random number returned by the Service Requester with the result of its own encryption process. If these numbers are the same, then the Service Requester is authentic and is allowed to access the requested Web-Service.

The Service requester, especially its SOAP client, creates a HTTP/SOAP Bind request using the service description for the requested Web-Service preferably provided by a Service-Broker and send the HTTP/SOAP Bind request to the ASP 4. The HTTP/SOAP Bind request is then forwarded to the Application server and SOAP server 5. The SAOP server requests to create an instance of the requested Web-Service 6. The SOAP client creates a HTTP/SOAP request for invoking the Resource-Counter Service using the service description of the Resource-Counter Service preferably provided by the Service-Broker and sends a HTTP/SOAP request to the SOAP server of the Resource-Counter Service 7. Preferably step 7 may be executed only if an additional authentication method for the Service-Provider as explained above has been performed. Then, the Resource-Counter Service is started 8. SOAP server sends HTTP/SOAP response to the requester indicating "Resource-Counter Service started" 8. Now the requested Web-Service is executed 10. When the Web-Service is completed 11, the SOAP client of the Service-Provider sends a HTTP/SOAP request to the Resource-Counter Service to stop counting 12 Then, the Resource-Counter Service is stopped 13. The Resource-Counter Service returns a response to the Service-Provider "Resource-Counter Service stopped" 15. Service-Provider, especially its SOAP server returns a response to the Service Requestor: Service completed, return result.

The following is a sample SOAP request message which can be used to record a client begin time:

```
<binding name="AServiceBinding" ......>
        <soap:binding ......./>
        <operation name="AService"
                <input message="tns:ServiceRequester">
                        <soap:header
    element="xsdl:ServiceRequesterId"/>
                        <soap:body element="........."/>
                </input>
        </operation>
</binding>
```

The soap:binding binds the Service Requester to the Resource-Counter Service Service-Provider and defines the type of SOAP message and the transport protocol. The Service Requestor identifies himself in the soap:header element, where the ServiceRequesterId is passed to the Service-Provider. This is a sample where this information is passed in the soap:header element. The soap header is an optional part of a SOAP message, and if not available, the ServiceRequesterId may also be passed as part of the soap:body element. The soap:body element carries the actual request to the Resource-Counter Service server, e.g. the client ID, the begin time e.t.c.

FIG. 6 shows an interaction diagram for creating a bill based on information received from the inventive Resource-Counter Service. The Service Requester has used Web-Services from ASP for some time, and the accounting and bill presentment application of the Service-Provider creates a bill out of the data from the Resource-Counter Service Service. Following steps are performed by this method:

The accounting application requests accounting of the Service Requester (client x) (1).

SOAP client sends a HTTP/SOAP request to the SOAP Server of the Resource-Counter Service requesting a usage report for client x for a timeframe y 2. The SOAP Server receives the accounting data for the requested timeframe from the data base 3. SOAP server returns a HTTP/SOAP response with the accounting data to the accounting application 4. Application produces a bill for client x based on the accounting data received from the Resource-Counter Service and the charging model for client x 5. Bill is sent to client x, e.g. e-mail. The bill creation may also be implemented as an extension to the Resource-Counter Service Service.

In that case the Service-Provider will only request the bill and the above disclosed method will be performed at the Resource-Counter Service Service.

In addition to bill presentment and calculating charges, the data of the Resource-Counter Service can be used to trigger any kind of electronic payment process. The data of the Resource-Counter can be mapped to different rating models. It therefore supports multiple Service providers with their different business models.

In summary, the Resource-Counter Service may provide following services:

accounting data for calculating service charge, e.g. record user begin time for the service, record user end time of the service, report total resource usage for a specific user, report used services statistic per user create Service Requester accounts (e.g. ad-hoc or by contract)

create Service-Provider contracts answer queries if USERID is allowed for a requested service at this time maintain Service Requester accounts provide a set of accounting model templates.

The invention claimed is:

1. A Service-Provider System for providing chargeable Web-Services for Service-Requesters comprising: a memory;
   a Service-Provider provided by a computer system, said Service-Provider comprising:
      a Service-Provider Web-Service component;
      a Service-Provider communication component (SOAP-server) allowing electronic communication between said Service-Provider system and a Service-Requester system using a SOAP-communication protocol, said Service Requester system provided by the computer system and having an application which generates digital data to be used by said Web-Service, a service description for accessing said Web-Service via said Service-Provider communication component (SOAP-server), and a communication component (SOAP-client) for exchanging digital data between said application and said Web-Service via said SOAP-server by using a SOAP-communication protocol;
      a service description for electronically accessing a Resource-Counter Service provided by another Service-Provider having a communication component (SOAP-client) allowing electronic communication with another Service-Provider system by using another SOAP-communication protocol, said Resource-Counter Service providing data for electronic calculation of charges of said Web-Service to be accessed by said Service Requester;
      a communication component (SOAP-client) for electronically exchanging data with a communication component (SOAP-server) of said Resource-Counter Service by using said service description of said Resource-Center Service and using a SOAP-communication protocol; and
      a bill presentment component having access to the data provided by said Resource-Counter Service for calculation of charges for Web-Service to be counted,
   wherein said service description for accessing said Resource-Counter Service is provided by a Service-Broker using a SOAP-communication protocol, said Service-Broker provided by said computer system,
   wherein said SOAP-communication protocol is based on a HTTP-protocol,
   wherein said service description is an XML document describing semantics and a message API (Application Programming Interface) of said Resource-Counter Service,
   wherein a Resource-Counter Service-Provider system for providing Resource-Counter Service for said Service-Provider system is provided by said computer system and comprises:
      said Resource-Counter Service component providing data for calculation of Web-Service to be accessed by Service Requester; and
      a communication component (SOAP-server) for electronically receiving data from a communication component (SOAP-client) located at the Service-Provider system, electronically passing said data to said Resource-Counter Service component, electronically receiving the result of the Resource-Counter Service component and electronically transmitting said result to the said communication component (SOAP-client) of said Service-Provider providing said Web-Service to be accessed by said Service Requester, the communication protocol used by said component being SOAP,
   wherein said Resource-Counter Service component is extended by a bill presentment functionality using the data provided by said Resource-Counter Service functionality and calculating charges for said Web-Service to be accessed,
   wherein said service description for accessing said Resource-Counter Service is created and published by said Resource-Counter Service-Provider system in a right category in the Service-Broker's taxonomy using SOAP communication protocol,
   wherein a Web-Service architecture is provided by said computer system and comprises:
      said Service-Requester system;
      said Service-Provider system; and
      said Resource-Counter Service-Provider system,
   wherein said Resource-Counter Service provides accounting services through a SOAP message response to said Service-Provider when said Server Requester requests said Web-Service from said Service-Provider,
   wherein said Web-Service is not free of charge, wherein said Resource-Counter Service receives a SOAP message request from said Service-Provider asking for a single accounting for said Service Requester by providing a begin time of said Web-Service and an end time of said Web-Service, wherein a database stores said single accounting, wherein said accounting services comprise a plurality of accountings compiled over an accounting period for said Service Requester, said plurality of accountings created by said Resource-Counter Service, stored in said database for maintenance by said Resource-Counter Service, and comprising said single accounting, said accounting period comprising a period of time, and wherein said Resource-Counter Service is contractually obligated to provide said accounting services to said Service-Provider by a contract created by said Resource-Counter Service.

* * * * *

UNITED STATES PATENT AND TRADEMARK OFFICE
CERTIFICATE OF CORRECTION

PATENT NO. : 7,613,817 B2
APPLICATION NO. : 10/466937
DATED : November 3, 2009
INVENTOR(S) : Eibach et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1762 days.

Signed and Sealed this

Nineteenth Day of October, 2010

David J. Kappos
*Director of the United States Patent and Trademark Office*